H. LEHMANN.

Barrel Pitching Machine

No. 8,168. Reissued April 9, 1878.

Witnesses.

Geo. W. Gibbitt

Samuel Osterhold

Inventor.

Henry Lehmann

N. PETERS, PHOTO-LITHOGRAPHER, WASHINGTON, D. C.

UNITED STATES PATENT OFFICE.

HENRY LEHMANN, OF CLEVELAND, OHIO.

IMPROVEMENT IN BARREL-PITCHING MACHINES.

Specification forming part of Letters Patent No. 171,672, dated January 4, 1876; Reissue No. 8,168, dated April 9, 1878; application filed November 3, 1877.

*To all whom it may concern:*

Be it known that I, HENRY LEHMANN, of Cleveland, in the county of Cuyahoga and State of Ohio, have invented a Barrel-Pitching Machine, of which the following is a specification:

This invention relates to an apparatus for pitching beer-barrels, or, in other words, coating the inside of barrels with pitch, in which there is employed a furnace, connected with a fan-blower, whereby the air-blast from the fan enters underneath the fire-grate of the furnace, and, passing up through the fire, injects live flame from the fire, mingled with melted pitch, through the injection-pipe at the top of the furnace into the barrel. The said injection-pipe is provided with a movable air-box, perforated and adapted for use as a cooling-chamber, in connection with the barrels being pitched.

To enable others to fully understand my invention, I will proceed to describe the same in detail, with the aid of the accompanying drawing, in which—

Figure 4:
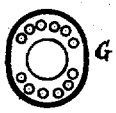
Figure 3:
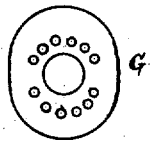
Figure 2:
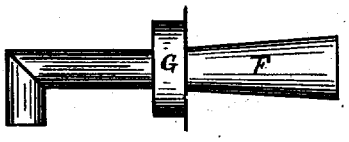
Figure 1:
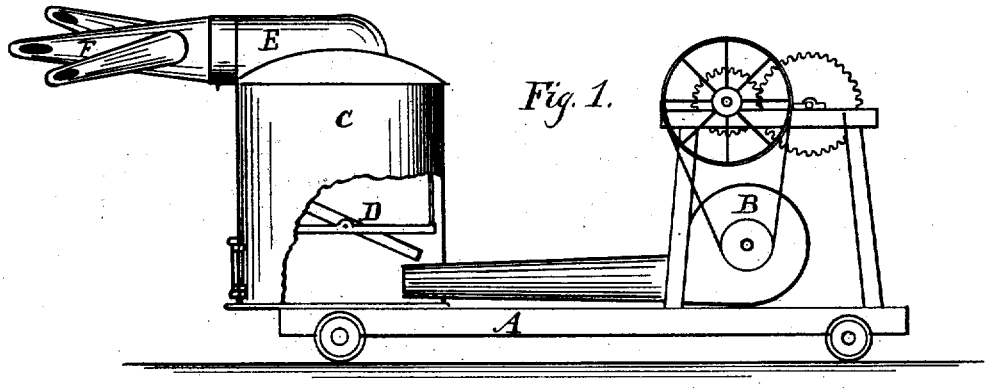

Figure 1 is a side elevation of the above-mentioned machine. Fig. 2 is a detached view of a single injection-pipe, Fig. 1 having a triple injector attached. Figs. 3 and 4 are face and rear views, respectively, of the air-box.

A is a bed or frame having casters or rollers, for convenience of easily transporting the machine. On one end of said bed is erected a frame, which supports the shafts, gears, and pulleys for propelling a fan, B, which rests on the bed within said frame. At the other end of the bed is placed a furnace, C, having a dumping fire-grate, D, beneath which the end of the pipe from the fan-blower enters. To the top of the furnace is attached an outlet-pipe, E, to which may be a triple nozzle, F, which would lead into three barrels or kegs at one time, thus facilitating the work of pitching.

In Fig. 2 is represented a single nozzle having a box or sleeve, G, Figs. 2, 3, and 4, made double to provide an air-space, and which is perforated for the circulation of air within it, the object being to surround the nozzle at its entrance to the barrel, to insure against the barrel becoming burned by excessive heat from the furnace.

The operation of this is as follows: The blast of air entering beneath the fire in the furnace and passing up through the same, enhances combustion and blows a stream of live fire or flame through the injection-pipe into the barrel. The pitch is thus thoroughly melted, and, although the pitch may be burning, the fire is immediately put out by withdrawing the pipe and closing the bung-hole.

I am aware that it is old to connect a fan-blower to a furnace in a barrel-pitching apparatus in order to drive heat into the barrel to be pitched.

What I desire to secure by Letters Patent is—

1. The nozzle F of a barrel-pitching machine provided with an air-box, G, constructed, arranged, and operating substantially as shown and described.

2. In a barrel-pitching machine, the combination of a nozzle entering the barrel to be treated, a heating-furnace, an air-box or sleeve having perforations therein and surrounding the nozzle, but not communicating therewith, and a fan-blower arranged to deliver its blast beneath the fire in the furnace, and thereby drive live flame into the barrel, substantially as described.

HENRY LEHMANN.

Witnesses:
GEO. W. TIBBITTS,
F. W. CADWELL.